UNITED STATES PATENT OFFICE.

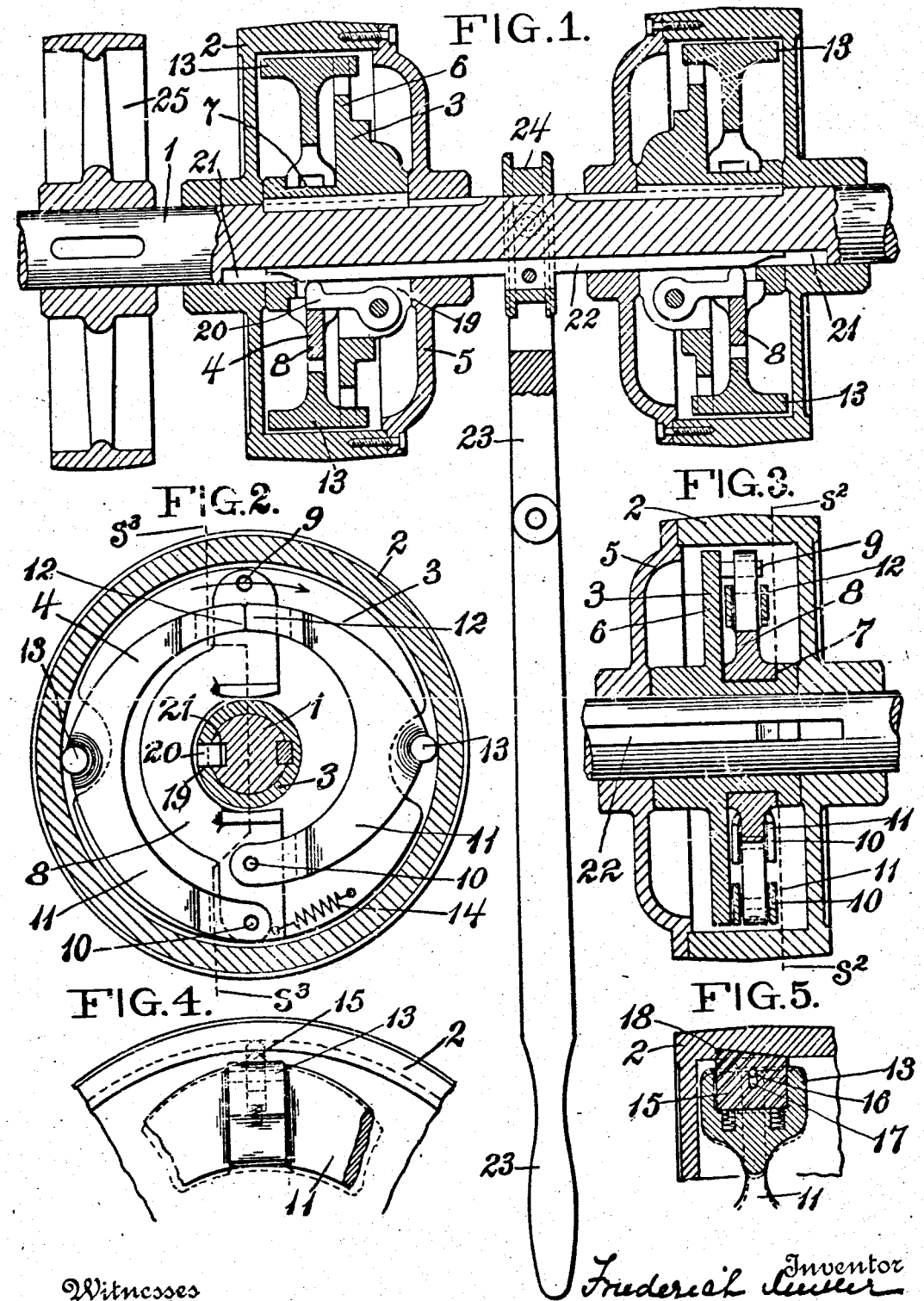

FRIEDERICH MÜLLER, OF ELIZABETH, NEW JERSEY.

CLUTCH.

No. 837,632.    Specification of Letters Patent.    Patented Dec. 4, 1906.

Application filed February 23, 1905. Serial No. 346,839.

*To all whom it may concern:*

Be it known that I, FRIEDERICH MÜLLER, a citizen of the United States, residing at Elizabeth, in the county of Union and State of New Jersey, have invented certain new and useful Improvements in Clutches, of which the following is a specification, reference being had therein to the accompanying drawings.

My invention relates generally to clutches, and as herein embodied is designed to produce a friction type of clutch employing mechanism which is normally effective in connecting the driving and driven members for the transmission of motion from one to the other and which may be disengaged at will.

The object of my invention, briefly stated, is to cause the several engaging members in a clutch of this character to become self-adjusting for wear; further, to cause such members to simultaneously move into or out of engagement, so as to avoid transverse thrust or unequal strain upon the shafting, and, finally, to cause the pressure under which the several members act to be equalized between them in order that they may be equally effective.

The accompanying drawings illustrate mechanism suitable for carrying my invention into effect. I wish it understood, however, that I do not limit myself to the mechanism shown, as various changes may be made therein or other mechanisms employed operating in substantially the same manner to produce practically the same result.

In the drawings, Figure 1 is a sectional view showing a portion of a reversing countershaft having oppositely-disposed clutches mounted thereon under the control of a single shift-lever. Fig. 2 is a cross-sectional view on the line $S^2 S^2$ of Fig. 3. Fig. 3 is a vertical sectional view on the line $S^3 S^3$ of Fig. 2. Fig. 4 is a detail view showing the engaging end of one of the clutch-arms and a portion of the driven member with which it coöperates, and Fig. 5 is a sectional view of the same.

Referring now to the drawings, I have shown a counter-shaft 1, having mounted thereon two oppositely-disposed clutches, identical in construction and operation and consisting, respectively, of a driven member 2, a driving member 3, and interposed mechanism 4, acting normally to establish a driving connection between the members 2 and 3 for the transmission of motion from one to the other.

The member 2 is shown loosely mounted upon the shaft, and while it may serve as either the driving or driven member it will for purposes of description be hereinafter considered and termed the "driven" member. It is preferably given the form of a drum having a removable cap 5, which is fitted oil-tight to provide a chamber interiorly thereof suitable for containing the member 3 and clutch mechanism 4, together with a body of oil or other lubricant in sufficient quantity to partially or wholly fill the chamber.

The member 3, to be hereinafter termed the "driving" member, is fast upon the shaft and is shown as a sleeve, which is flanged at 6 and grooved at 7 to provide requisite supports and guides for the mechanism 4, which is mounted thereon.

The mechanism 4, constituting the clutch proper, comprises a lever 8, which is pivoted at one end upon a drive-pin 9, projecting from the flange 6 of the member 3 and is shaped about centrally of its length to enter the groove 7, which serves as a guide to limit the play thereof. Pivoted at 10 10 upon the free end of the lever there are two arms 11 11, preferably curved, as shown, to encircle the member 3. The arms 11 abut at their free ends 12 12 and combine with the lower end of the lever as a connecting-link to form a sectional ring, the expansion and contraction of which is controlled by the lever 8 and serves to throw the clutch in and out of operation, as will be later on explained. At suitable points within their length, preferably about centrally thereof, the arms 11 11 are provided with enlarged bearings 13 13, designed to frictionally engage the inner periphery of the driven member 2 and normally held in contact relation therewith under the yielding action of one or more springs 14, arranged, as shown, to pull the lever inward toward the shaft.

From the foregoing it will be seen that when the clutch is thrown into operation the load resists movement of the driven member 2. On the other hand, the movement of the power-shaft 3 and the flange 6, which is keyed to the shaft, will exert a constant pull upon the pivoted end of the lever 8 through the pin 9 in the direction indicated by the arrow in Fig. 2, the effect of which will be to change the angular position of the pivotal points 10 and 10 of the arms 11 11, thereby increasing the distance between the inner peripheries of these arms, or, what is the same thing, increasing the diameter of the ring formed by these two arms, and thereby bringing these arms into engagement with the driven member to impart motion thereto.

Any variation of the load will obviously be followed by a corresponding variation in the pull or pressure exerted by the driving member 3 upon the pivoted end of the lever 8, due to the fact that when the clutch is in operation the load resists movement of the driven member 2. This resistance, obviously operating against the non-pivoted end of the lever 8, tends to retard rotative movement of this end of said lever, and therefore change the relative inclination of said lever with respect to the member 3. The arms 11 and 11ᵃ being of different lengths and pivoted at different points near the free end of said lever, their consequent "expansion" or separation—due to the inclining of that portion of the lever 8 as forms a connecting-link therebetween—serves to force outwardly and into greater or less positive frictional engagement with the member 2 the bearing faces or members 13 13 on said arms. It will therefore be apparent that through the action of the lever in normally tending to spread or separate the arms they become thereby self-adjusting to take up for wear at the bearings 13 thereof, and as they fulcrum upon each other the driving power or pressure is automatically equalized between them, and they move simultaneously in or out of engagement with the driven member under a force which is at all times proportionate to the resistance of the load.

In order to avoid lost motion or delayed action, the springs 14, above referred to, are employed to supply the initial pressure necessary for normally establishing a driving connection between the clutch members—that is to say, such springs act to pull the lever 8 toward the shaft or in a direction to spread the arms and maintain the bearing-points thereof in contact relation with the driven member under a yielding pressure. In many instances the use of one or more springs may prove desirable; but they are not essential to the operation of the device and serve simply to insure an immediate coöperaion of the parts.

As a means of avoiding direct contact and the resulting wear upon the arms 11 bearing-blocks 15 may be interposed between the same and the inner periphery of the driven member. When such blocks are employed, the arms 11 are socketed, as shown in Figs. 4 and 5, to receive the same, which are spring-seated therein and secured by a pin 16, passing through a slot 17. The necessary slippage to prevent shock and insure a gradual engagement of the bearings with the driven member is obtained in the usual manner by forming the contacting surfaces at a slight angle and providing an annular shoulder 18 upon the inner periphery of the driven member, which acts as a positive stop against which the bearing-blocks rest when the clutch is in full operation.

It being understood that the clutch is normally engaged, I will now describe means for throwing it out to disconnect the driving and driven members.

The sleeve of the driving member is slotted, as indicated at 19, and pivotally mounted in the slot there is a dog or pawl 20, which is shaped at its free end to enter a longitudinal groove 21 in the shaft, in which it is yieldingly held by the lever 8 under the action of the spring 14. The movement of the dog to produce the required adjustment of the lever 8 is effected by a cam-rod 22, sliding in the groove 21 of the shaft. One end of the rod is beveled in order that the lever 8 may be gradually shifted, and as the rod is moved it acts to cam the dog out of the groove, causing the latter to in turn act upon the lever 8 and swing the free end thereof toward the left as viewed in Fig. 2 in a direction to change the relative position of the pivotal points 10 10 and draw the arms 11 11 together until the distance separating the bearing-points 13 is less than the internal diameter of the driven member, in which position the device is wholly ineffective and the members 2 and 3 are disconnected and may be rotated independently in either direction.

In the arrangement shown in Fig. 1, in which two oppositely-disposed clutches are mounted upon the same shaft, the cam-rod 22 is beveled at opposite ends to coöperate with both clutches and is shifted in the usual manner by means of a hand-lever 23, connected therewith through a sliding collar 24. When the lever is in the position shown, both clutches are thrown out. Shifting the lever toward the right or left, however, will result in releasing one or the other of the clutches, which becomes at once effective in producing rotation of the shaft, which motion is transmitted in the usual manner through a pulley 25, fast upon the shaft and belted to the machine to be driven.

Having thus described my invention, I claim—

1. The combination of a driving member, a driven member, a clutch device interposed between the two, said clutch device having two coacting arms, means controlled by the load for automatically varying the distance between the acting faces of said arms, and means for rendering said clutch device inoperative.

2. The combination of a driving member, a driven member, a clutch device interposed between the two, said clutch device having two coacting arms, means controlled by the load and common to both of said arms to automatically vary the distance between the acting faces of said arms, and means for rendering said clutch device inoperative.

3. The combination of a driving member, a driven member, a clutch device interposed between the two, said clutch device having two coacting arms, means controlled by the load and common to both arms for automatically varying the distance between the acting faces of said arms proportionately to the resistance of the load, and means for rendering said clutch device inoperative.

4. The combination of a driving member, a driven member, a clutch device interposed between the two, said clutch device comprising a lever and two coacting arms, and means controlled by the load for automatically changing the relative inclination of the lever and thereby varying the distance between the acting faces of said arms.

5. The combination of a driving member, a driven member, a clutch device interposed between the two, said clutch device comprising a lever and two coacting arms, means controlled by the load for changing the position of the lever and through it the distance between the acting faces of said arms, and means not under the control of the load for decreasing the distance between the acting faces of said arms.

6. The combination of a driving member, a driven member, a clutch device interposed between the two, said clutch device comprising a lever and two arms pivoted at different points on said lever, and means controlled by the resistance of the load for automatically changing the relative inclination of said lever and thereby varying the distance between the acting faces of said arms.

7. The combination of a driving member, a driven member, a clutch device interposed between the two, said clutch device comprising a lever and two arms pivoted at one end of the lever, means controlled by the load for changing the position of the lever and through it the distance between the acting faces of said arms, and means not under the control of the load for changing the position of the lever and through it decreasing the distance between the acting faces of said arms.

8. The combination of a driving member, a driven member, a clutch device interposed between the two, said clutch device comprising a lever pivoted at one end to the driving member, two arms, one end of each being pivoted, at different points, near the other end of said lever and directly acting against each other at their other ends, said arms being provided with faces adapted to frictionally engage said driven member.

9. The combination of a driving member, a driven member, a clutch device interposed between the two, said clutch device comprising a lever pivoted at one end to the driving member, two arms pivoted at one end to the other end of said lever and abutting at their other ends, and means controlled by the load for automatically changing the relative inclination of said lever and thereby proportionately varying the distance between the acting faces of said arms.

10. The combination of a driving member, a driven member, a clutch device interposed between the two, said clutch device comprising a lever pivoted at one end to the driving member, two arms pivoted at one end to the other end of said lever and abutting at their other ends, means controlled by the load for changing the position of said lever and through it the distance between the acting faces of said arms, and means not under the control of the load for moving said lever and through it decreasing the distance between the acting faces of said arms.

11. The combination of a driving member, a driven member, a clutch mechanism interposed between the two comprising a lever, two clutch-arms having ends pivoted at different points on said lever and ends each constituting an abutment for the other, and means for varying the relative inclination of said lever to throw said clutch-arms into and out of engagement with said driven member.

12. The combination of a driving member, a driven member, a clutch mechanism interposed between the two comprising a lever, two clutch-arms having ends pivoted at different points on said lever and ends each constituting an abutment for the other, and two separate and distinct means for varying the relative inclination of said lever, one automatically controlled by the load and the other under manual control.

13. The combination of a driving member, a driven member, a clutch mechanism interposed between the two comprising a lever connected to the driving member, two clutch-arms under control of the lever, and two independent means, one automatically controlled by the load and the other under manual control, for varying the relative inclination of said lever and thereby the positions of said arms and the pressure against the driven member.

14. The combination of a driving member, a driven member, a clutch mechanism interposed between the two comprising a lever connected at one end to the driving member, a pair of clutch-arms pivotally connected at one end to the opposite end of said lever and abutting at their other end, together with means for changing the longitudinal axis of the lever relative to the rotating axis of the driven member.

15. The combination of a driving member, a driven member, a clutch mechanism interposed between the two comprising a lever having its longitudinal axis substantially bisecting the axis of rotation of said members, and two coacting clutch-arms under the control of said lever, whereby when said lever is relatively inclined in one direction the distance between said arms will be increased, and when relatively inclined in the other direction the distance between the arms will be decreased, and means for controlling the positions of said lever.

16. The combination of a driving member, a driven member, a clutch mechanism interposed between the two comprising a lever having its longitudinal axis substantially bisecting the axis of rotation of said members, and two coacting clutch-arms under the control of said lever whereby when said lever is relatively inclined in one direction the distance between said arms will be increased and when relatively inclined in the other direction the distance between the arms will be decreased, means under control of the load for inclining and proportionately varying the inclination of said lever in the direction to increase the normal distance between said arms, and means under manual control for inclining said lever in the other direction.

17. The combination of a driving member, a driven member, a clutch mechanism interposed between the two comprising a lever pivoted at one end to and near the periphery of the driving member, clutch-arms pivoted at different points near the other end of said lever and abutting at their non-pivoted ends near the pivoted end of said lever.

18. The combination of a driving member, a driven member, a clutch mechanism interposed between the two comprising a lever pivoted at one end to and near the periphery of the driving member, clutch-arms pivoted at different points near the other end of said lever and abutting at their non-pivoted ends near the pivoted end of said lever whereby relative inclination of said lever in one direction will proportionately increase, and in the other direction proportionately decrease, the normal distance between the acting faces of said arms, and means for effecting such inclination in the direction to decrease said distance.

19. The combination of a driving member, a driven member, a clutch mechanism interposed between the two comprising a lever pivoted at one end to the periphery of the driving member, clutch-arms pivoted at one end of said lever and abutting at their non-pivoted ends near the pivoted end of said lever, and a dog or pawl situated in a position to impart motion to said lever in one direction and thereby decrease the distance between the acting faces of the clutch-arms.

20. The combination of a driving member, a driven member, a clutch device interposed between the two provided with coacting clutching-arms, means whereby said arms will simultaneously engage the driven member with a pressure proportional to the work and without exerting lateral pressure upon the driving-shaft, and means for throwing said arms out of engagement with the driven member.

21. The combination of a driving member, a driven member, a clutch device interposed between the two comprising two arms, means whereby the work resistance of the driven member is transmitted through one arm to the second arm and equalized through both arms to effect a clutching pressure, and means acting upon one arm and transmitted to the second arm for decreasing the clutching pressure.

22. The combination of a driving member, a driven member, clutch mechanism interposed between the driving and driven members and comprising a lever pivotally mounted upon one of said members, and two coacting arms pivotally mounted upon the lever, said clutch mechanism operating automatically to transmit the motion of the driving member in one direction to the driven member, and means for imparting movement to the lever to act upon and simultaneously throw both arms out of effective engagement.

23. A clutch comprising an outer member, an inner member, a self-engaging power-transmitting connection normally in contact relation with the outer member at points throughout the circumference thereof, means for varying the total pressure in accordance with variations in the load which includes means for equalizing the pressure of the contact-surfaces and controlling means for rendering the power-transmitting connection ineffective.

24. The combination of a driving member, a driven member, and coöperating clutch devices, operative in one direction only, interposed between said driving and driven members and arranged each to receive the thrust of the other when under normal action in transmitting the motion of the driving member to the driven member, together with means for causing the several clutch devices to become simultaneously inoperative.

25. The combination of a driving member, a driven member, an intermediate member movable in a plane at right angles to the axis of said driving and driven members and directly connected with and operable by means of said driving member, self-engaging clutch devices controlled by said intermediate member, said clutch devices being operative in one direction only and serving to transmit the motion of the driving member to the driven member, and means for causing the several clutch devices to become simultaneously disengaged.

26. The combination of a driving member, a driven member, an intermediate member movable in a plane at right angles to the axis of said driving and driven members, self-engaging clutch devices controlled by said intermediate member, said devices being operative in one direction only and serving normally to transmit the motion of the driving member to the driven member, and means applied to said intermediate member for causing the several clutch devices to become simultaneously ineffective.

27. The combination of a driving member, a driven member, requisite clutch mechanism including a self-acting clutch-lever adapted and arranged to operatively connect the driving and driven members when moving in one direction only, without imposing a radial thrust intermediate said members, and means for forcibly interrupting the operative action of said clutch in different positions in its path of rotary movement.

28. The combination with a supporting-shaft, of a clutch comprising a member fixed upon said shaft, a loosely-mounted member carried by said shaft and surrounding the fixed member, an operating-lever carried by said fixed member, clutch-levers pivotally connected with said operating-lever, and each carrying a yielding friction-block, said clutch-levers pressed normally in contact with said loose member of the clutch, and means for controlling said operating-lever for preventing the operative engagement of said friction-block with said loose member.

29. The combination with a supporting-shaft, of a clutch comprising a member fixed upon the shaft, a lever connected at one end to said fixed member, a pair of coöperating clutch-arms pivotally connected at one end with the movable end of said lever and at different distances from its end and having their other ends abutting, a spring interposed between the said fixed member and the movable end of said lever, and means for moving said lever in a direction opposed to the action of said spring.

30. The combination, with a driving member and a driven member, of a clutch device comprising an operating-lever and two oppositely-acting arms fulcrumed against each other and of different lengths, whereby said arms may be simultaneously moved to and from each other by varying the relative inclination of said operating-lever to which both of said arms are secured.

31. A clutch-operating mechanism comprising, with the driving and the driven members, two oppositely-acting arms fulcrumed against each other and of different lengths, and an operating-lever to different points on which the non-abutting ends of said arms are pivoted.

32. A clutch mechanism comprising, with the driving and driven members, two bearing members angularly braced from a relatively common point on one side thereof and on the other side from different points on a controlling-lever, and a controlling-lever having its longitudinal axis substantially at right angles to the axis of rotation of the driving and driven members.

33. A clutch mechanism comprising, with the driving and driven members, two bearing members angularly braced against each other at a point on one side thereof and on the other side from different points on a controlling-lever, and a controlling-lever whose longitudinal axis is substantially at right angles to the axis of rotation of the driving and driven members.

34. In combination, a driving member, a driven member, and a clutch mechanism therebetween comprising an open ring, and an operating-lever pivoted to said driving member, the open ends of said ring being pivoted to said lever at unequal distances from its free end.

35. The combination, with a driving member and a driven member, of a clutch device comprising an open ring having its ends brought into lateral juxtaposition, and a radially-disposed link connecting said ends, said link being extended to provide an operating-lever to expand and contract said ring.

36. In combination, a driving member, a driven member, and a clutch mechanism therebetween comprising an open ring having its ends brought into lateral juxtaposition, and a radially-disposed link connecting said ends, said link being extended to provide an operating-lever to expand and contract said ring, said lever being pivoted to said driving member.

In testimony whereof I have signed my name to this specification in the presence of two subscribing witnesses.

FRIEDERICH MÜLLER.

Witnesses:
  JOSEPH F. JAQUITH,
  H. A. KORNEMANN.